3,291,429
EYEGLASSES HOLDER
Nick C. Neanhouse, Chicago Ridge, Ill.
(7133 W. 109th, Worth, Ill.)
Filed Oct. 24, 1965, Ser. No. 504,817
3 Claims. (Cl. 248—206)

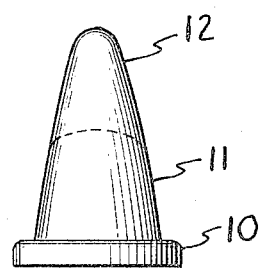
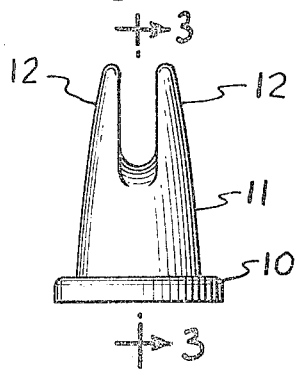
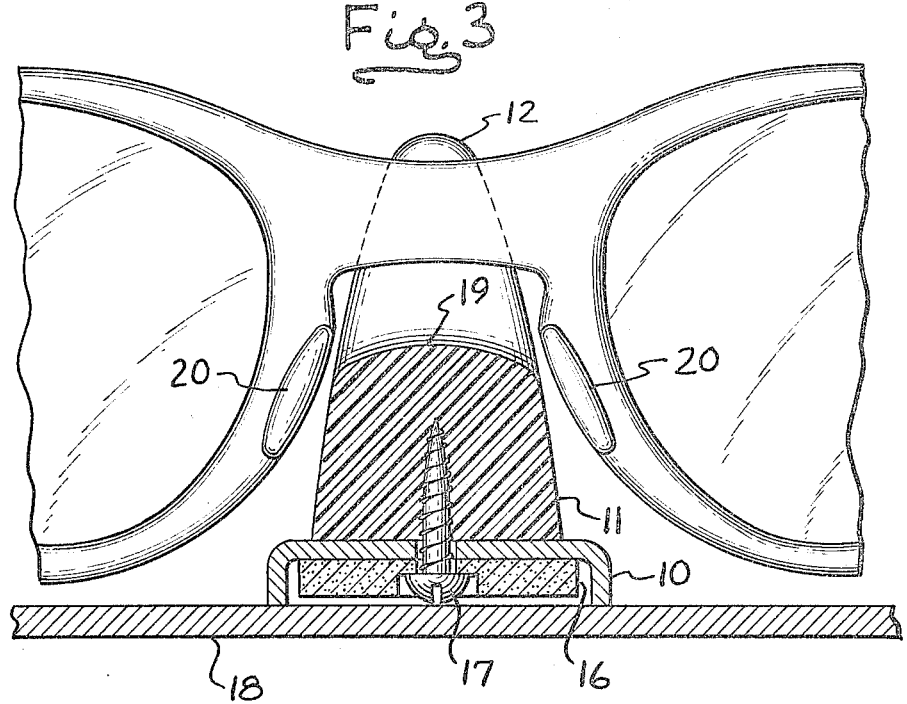

This invention relates generally to eyeglasses holders, and more particularly to a holder for conveniently supporting a pair of sunglasses on an automobile dashboard when the sunglasses are not in use.

Motorists have found sunglasses to be an important driving accessory, providing comfort and safety while relieving the driver from eyestrain over extended periods of travel. However, modern driving conditions create considerable inconvenience for the wearer. Bridges, underpasses, and tunnels present conditions of temporarily diminished illumination, requiring that the driver remove his sunglasses as he passes through. If he is to retain the use of both hands for operating the automobile, the sunglasses must be set aside until they are again needed. Modern automobiles, however, generally present no convenient resting place. If the sunglasses are placed before the driver on the automobile dashboard, they are free to bounce, rattle and slide about, and may even fall off and be damaged. If they are placed in the driver's lap, they may fall to the floor. They may be placed in the adjoining passenger seat, but this is generally unsatisfactory since the seat may be occupied, and in any case the driver must divert his attention from the road to retrieve them when they are needed. The glove compartment is similarly unsuitable, because it is ordinarily a great reach from the driver's seat and requires operation of a latch, again diverting the driver's attention.

It is therefore a principal object of the present invention to provide a holder for conveniently but securely supporting a pair of eyeglasses on an automobile dashboard. A related object is to provide such a holder from which the eyeglasses may be conveniently retrieved when they are again needed.

Another object is to provide an eyeglasses holder for attachment to an automobile dashboard which securely but releasably attaches to the dashboard, without the need of screws, adhesives, or other means of attachment which would deface the dashboard surface. A related object is to provide such a holder which will support a pair of eyeglasses gently but securely, without danger of scratching or marring the eyeglasses frame.

Other objects and advantages of the invention will become apparent upon reading the following detailed description and upon reference to the drawings, in which:

FIGURE 1 is an elevation of the eyeglasses holder of the present invention;

FIGURE 2 is an elevation roatated 90° from that of FIG. 1; and

FIGURE 3 is a section taken through the plane 2–3 of the eyeglasses holder in FIG. 2.

While the invention will be described in connection with the preferred embodiment, it will be understood that I do not attempt to limit the invention to that embodiment but intend to cover all alternative constructions and equivalents as may be included within the spirit and scope of the invention as defined by the appended claims.

Referring to the drawings, there is shown the eyeglasses holder of the present invention, having a base 10 and a pillar 11 ending in a pair of fingers 12 defining a notch adapted to receive the bridge of a pair of eyeglasses. The base 10 comprises a simple decorative cup which encloses a small magnet 16. The magnet 16 and base 10 are secured to the pillar 11 by a central screw 17 which completes the assembly. In use, the eyeglasses holder is simply placed on a relatively flat metal portion of an automobile dashboard 18 where the magnet 16 will attractively attach the eyeglasses holder in a substantially vertical position. While gentle curvature may be accommodated, a dashboard location having a sharp radius of curvature should be avoided, as the holder may be unstable and tend to rock back and forth.

It is a feature of the invention that the magnet 16 attaches without the use of permanent mounting means, and may be easily removed without leaving a mark on the mounting surface. The magnet 16 is recessed slightly into the decorative base 10, leaving only the edges of the base 10 to contact the dashboard surface. The base then may be constructed of smooth, non-marring material such as plastic or of metal if the edges are carefully polished.

The material of the pillar 11 is preferably of a relatively soft, non-metallic substance, such as rubber or plastic. Materials such as metal are likely to have sharp edges and to cause scratching of the eyeglasses frames, even when lined or their inner surfaces with a softer material such as foam rubber. A more preferable material is therefore one which allows the fingers 12 to be smooth and relatively soft, and it has been found that plastic or wood is more suitable. As an alternative, the fingers 12 may be made of a flexible, resilient material, such as certain kinds of rubber or plastic, and the notch may be made narrower so that the bridge of the pair of eyeglasses is gripped lightly by friction. With this construction, however, it is still necessary that the notch be relatively deep, so that the eyeglasses may be inserted sufficiently far so that they contact the automobile dashboard 19 at one or more other points in addition to being supported by the holder.

In the illustrated embodiment, the fingers 12 define a notch which is proportioned to accept the bridge of a pair of eyeglasses. The bottom 19 of the notch is preferably made deep enough so that the eyeglasses may be inserted to a depth which allows the lower portion of their lenses or the tips of their temple portions to rest on the automobile dashboard 18. This allows the preponderance of the eyeglasses weight to be supported by the dashboard itself rather than by the eyeglasses holder, relieving the fingers 12 from most of the function of supporting the eyeglasses in the vertical direction. The fingers 12 are spaced from each other by an amount which assures fore-and-aft support for the eyeglasses bridge, while allowing the eyeglasses to be freely inserted and removed. The notch is therefore made considerably deeper than it is wide, and the bridge of the eyeglasses will preferably not touch the bottom 19 of the notch.

It will be seen that the fingers 12 not only provide fore-and-aft support for the eyeglasses, but that lateral support is also furnished, preventing the eyeglasses from sliding sideways under the forces present in a moving automobile. Eyeglasses are commonly provided with nosepieces 20, which comprise a thickening at each side of the bridge and serve to support the eyeglasses on the nose of the wearer. The fingers 12 are therefore preferably constructed with sufficient width to substantially fill the space between the nosepieces 20 of the eyeglasses and thereby the eyeglasses are prevented from sliding sideways in the holder.

From the foregoing description, it may be seen that the eyeglasses holder of the present invention provides both fore-and-aft and lateral support, while leaving the weight of the eyeglasses to be borne by the dashboard itself. This accomplishes the objectives of providing a secure location for a pair of eyeglasses on an automobile dashboard directly in front of a driver and permitting the eyeglasses to be conveniently inserted or removed.

I claim as my invention:

1. An eyeglasses holder comprising, in combination, an inverted cup-shaped base made of smooth non-marring material, a magnet enclosed and inset within said base, a tapered upright pillar having spaced fingers, and securing means for securing said base, magnet, and pillar together, said fingers defining a notch and adapted to embrace the bridge of a pair of eyeglasses and restrain the eyeglasses from tipping about their point of support within the notch.

2. An eyeglasses holder comprising, in combination, a magnetic base attachable by magnetic attraction to a relatively flat metal mounting surface, and a tapered upright substantially cone-shaped pillar secured to said base and having a pair of spaced fingers insertable between the nosepieces of a pair of eyeglasses, said fingers defining a notch which is deeper than the level of the bridge of a pair of eyeglasses retained in the notch when said eyeglasses are resting on and supported on both sides of said bridge by the mounting surface.

3. The eyeglasses holder of claim 2 in which the fingers are flexible and resiliently grip the bridge of a pair of eyeglasses supported therein.

References Cited by the Examiner

UNITED STATES PATENTS

| | | | |
|---|---|---|---|
| 2,411,361 | 11/1946 | Bongiovanni | 248—300 |
| 2,702,683 | 2/1955 | Green et al. | 248—309 |
| 2,731,224 | 1/1956 | MacDonald | 248—42 |
| 2,855,242 | 10/1958 | Holmes | 296—97 |
| 2,958,495 | 11/1960 | Foster | 248—176 |
| 2,978,215 | 4/1961 | Shanok et al. | 248—115 |
| 3,109,619 | 11/1963 | Krug et al. | 248—360 |

FOREIGN PATENTS

| | | |
|---|---|---|
| 644,995 | 6/1928 | France. |
| 1,271,112 | 7/1961 | France. |

CLAUDE A. LE ROY, *Primary Examiner.*